Sept. 8, 1970          J. TORRE          3,527,909

DEFFERENTIAL PRESSURE SENSITIVE SWITCH

Filed May 2, 1968

INVENTOR:
JEAN TORRE

United States Patent Office 3,527,909
Patented Sept. 8, 1970

---

3,527,909
DIFFERENTIAL PRESSURE SENSITIVE SWITCH
Jean Torre, 13 Boulevard Burel, Marseille, France
Filed May 2, 1968, Ser. No. 726,134
Claims priority, application France, May 19, 1967,
21,863
Int. Cl. H01h *35/34;* G01m *3/26*
U.S. Cl. 200—83                                 2 Claims

ABSTRACT OF THE DISCLOSURE

A compressed air supply is connected to one chamber of a differential pressure sensitive switch and a container, that is being tested for fluid-tightness, is connected to another chamber of the switch. Both chambers and the container are pressurized by the air supply and then the air supply is shut off. Should the container burst a partition separating the two chambers will be displaced, thus closing two contacts that complete an electrical circuit to a signalling device. The partition has a window that is bridged in a fluid-tight manner by a resiliently flexible diaphragm of lesser resistance to flexing than the partition, so that if there is any micrometric lowering of pressure, the more sensitive-diaphragm will react and operate the signal.

---

The invention relates to the construction of a device for checking the fluid-tightness of containers made of synthetic or other materials, making it possible to detect micro-porosities or other manufacturing flaws prior to use.

Its characteristic features are the means used, either taken together or separately, and in particular the addition, to the partition dividing the balancer into two chambers, of a second incorporated and more sensitive diaphragm connected to a contactor making or breaking a signal circuit when the main diaphragm does not distort, i.e. when the check container, although fluid-tight, has a degree of porosity which allows infinitesimal quantities of compressed air or gas to escape, such quantities being insufficient to cause the fluid-tightness signal to operate.

In the accompanying drawings, which shows as a non-limiting example one form of construction of the invention:

Figure 2:
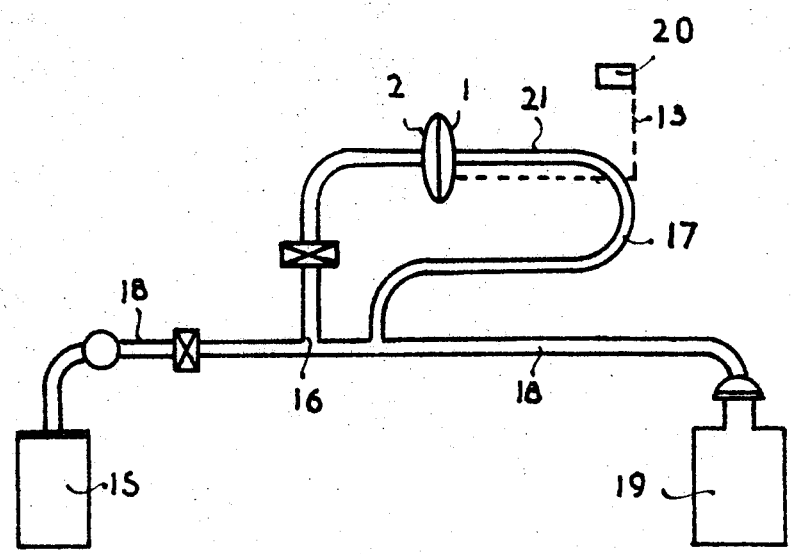
FIG. 2 is a schematic circuit diagram of the apparatus showing the hydraulic connections whereby air under pressure is supplied to the test device and the bottle to be checked.

According to the method of using the leak test system of FIG. 2 the entire system is pressurized by source 15. When the pressures in chambers 1 and 2 are equalized the two valves in FIG. 2 are closed. Thereafter, any leakage from test unit 19 results in a reduced pressure in chamber 1, causing flexing of diaphragm 9.

The pressure sensitive device comprises chambers 1 and 2 separated by a partition 3 fixed peripherally to the outer wall of the device.

The partition 3 is provided with a cavity 8 forming a window in said partition 3 closed by a diaphragm 9 which has less resistance to flexing than said partition 3.

Figure 1:
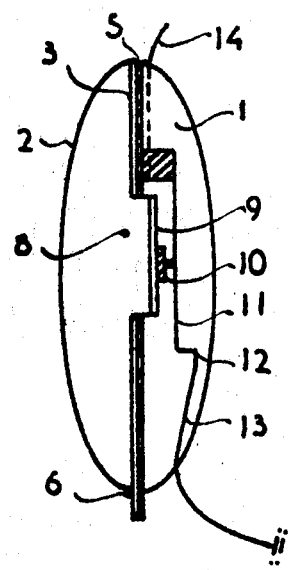
FIG. 1 shows the diaphragm incorporated in the main partition.

Diaphragm 9 is provided with a push-button 10, arranged to push a conductive flexible blade 11 into contact with a stud 12 connected to a conductor 13, which in turn is connected to a signalling device 20, thus closing an electrical circuit on flexing of said diaphragm, the circuits being fed by the power line 14. The apparatus for testing fluid-tightness of containers comprises a compressed air supply 15 connected by means of a shunt 16 to a chamber 2 of the pressure sensitive device 8 (FIG. 1), while the chamber 1 thereof is connected by means of a shunt 17 to a pipe 18 connected to a container 19 under test.

In order to provide a dynamic rather than a static system a micro-orifice 21 is provided in the shunt 17, causing a continuous known decrease of pressure in the shunt 17.

The container to be checked is connected to the compressed air supply 15 by means of the pipe 18. Decrease in pressure caused in the chamber 1 by air seepage through the container 19 over and above the known seepage caused by micro-orifice 21 displaces the partition 3 and operates the signal 20.

If there is any "porosity" and micrometric lowering of pressure, the more sensitive diaphragm 9 will react and operate the signal 20, if there is a sudden decrease in pressure, e.g. if the container were to burst, the partition 3 would be flexed thus protecting the more sensitive diaphragm 9.

I claim:
1. A fluid pressure sensitive device comprising a body including first and second chambers separated in fluid-tight manner by a resiliently flexible partition, each said chamber having a respective fluid supply port, said partition including a window therein bridged in fluid-tight manner by a resiliently flexible diaphragm of less resistance to flexing than said partition, and electrical switch means disposed in one of said chambers and having a first contact carried by the body and a second moveable contact carried by the partition and positioned to be abutted by said diaphragm to close the switch when said diaphragm is flexed by a relative higher fluid pressure in the other of said chambers.

2. A fluid pressure sensitive device, as claimed in claim 1, wherein said first contact comprises a terminal mounted in said one chamber, and the second contact is a resiliently flexible contact blade mounted by one of its ends on the partition and normally spaced at the other end from the first contact, and pusher means disposed and acting between the diaphragm and the contact blade.

References Cited

UNITED STATES PATENTS

| | | | |
|---|---|---|---|
| 2,814,203 | 11/1957 | Donohoe | 73—40 XR |
| 3,041,834 | 7/1962 | Davies et al. | 73—40 XR |
| 3,206,980 | 9/1965 | Nelson. | |
| 3,326,034 | 6/1967 | Fitzpatrick et al. | 73—40 |

FOREIGN PATENTS 1,474,553   3/1967   France.

LOUIS R. PRINCE, Primary Examiner

HARRY C. POST III, Assistant Examiner

U.S. Cl. X.R.

73—49.2, 406